US007216804B2

(12) United States Patent
Herring

(10) Patent No.: US 7,216,804 B2

(45) Date of Patent: May 15, 2007

(54) POSTAGE METERING SYSTEM

(75) Inventor: William James Herring, Essex (GB)

(73) Assignee: Neopost Industrie SA, Bagneux (FR)

( * ) Notice: Subject to any disclaimer, the term of this patent is extended or adjusted under 35 U.S.C. 154(b) by 0 days.

(21) Appl. No.: 10/503,169

(22) PCT Filed: Jan. 31, 2003

(86) PCT No.: PCT/GB03/00389

§ 371 (c)(1), (2), (4) Date: Aug. 22, 2005

(87) PCT Pub. No.: WO03/065313

PCT Pub. Date: Aug. 7, 2003

(65) Prior Publication Data

US 2006/0032910 A1 Feb. 16, 2006

(30) Foreign Application Priority Data

Jan. 31, 2002 (GB) ................................ 0202269.7

(51) Int. Cl.

| | |
|---|---|
| ***G06F 7/08*** | (2006.01) |
| ***G06F 17/00*** | (2006.01) |
| ***G07B 17/02*** | (2006.01) |
| ***G06Q 99/00*** | (2006.01) |
| ***H04K 1/00*** | (2006.01) |

(52) U.S. Cl. ........................ 235/381; 705/401; 705/60; 700/235; 235/380

(58) Field of Classification Search ................ 235/381, 235/380; 705/401, 60; 700/235

See application file for complete search history.

(56) References Cited

U.S. PATENT DOCUMENTS

| | | | | | |
|---|---|---|---|---|---|
| 4,506,344 | A | * | 3/1985 | Hubbard | 705/401 |
| 4,780,835 | A | * | 10/1988 | Sievel et al. | 705/408 |
| 4,812,965 | A | | 3/1989 | Taylor | |
| 4,812,994 | A | * | 3/1989 | Taylor et al. | 705/410 |
| 4,962,459 | A | * | 10/1990 | Mallozzi et al. | 705/404 |
| 5,369,401 | A | * | 11/1994 | Haines | 705/403 |
| 5,452,654 | A | * | 9/1995 | Connell et al. | 101/91 |
| 5,585,613 | A | * | 12/1996 | Bell et al. | 235/101 |
| 5,602,742 | A | * | 2/1997 | Solondz et al. | 705/410 |
| 5,613,007 | A | * | 3/1997 | Balga, Jr. | 380/51 |
| 5,745,887 | A | * | 4/1998 | Gargiulo et al. | 705/410 |
| 5,796,834 | A | | 8/1998 | Whitney et al. | |

(Continued)

FOREIGN PATENT DOCUMENTS

EP 0782110 7/1997

(Continued)

*Primary Examiner*—Daniel Walsh

(74) *Attorney, Agent, or Firm*—Renner, Otto, Boisselle, & Sklar, LLP

(57) ABSTRACT

A postage metering system for applying indicia including postage value on mail items, the system including: a keyboard for inputting information; a printer for printing indicia; an accounting module for accounting for postage value applied to mail items; and a security module for requiring a user to input an operating code prior to further operation of the system, the security module being configured to compare the input operating code with at least one stored valid operating code and cause the printer in a printing operation to print an indicium having a zero postage value where the input operating code and any stored operating code do not match and printing of an indicium is requested.

10 Claims, 1 Drawing Sheet

U.S. PATENT DOCUMENTS

| | | | | |
|---|---|---|---|---|
| 5,812,536 | A * | 9/1998 | Manduely | 370/282 |
| 5,812,991 | A * | 9/1998 | Kara | 705/410 |
| 5,917,924 | A * | 6/1999 | Herbert | 382/101 |
| 5,923,762 | A * | 7/1999 | Dolan et al. | 380/51 |
| 5,991,409 | A * | 11/1999 | Windel et al. | 705/62 |
| 6,039,257 | A * | 3/2000 | Berson et al. | 235/468 |
| 6,064,992 | A * | 5/2000 | Herring | 705/403 |
| 6,385,731 | B2 * | 5/2002 | Ananda | 726/6 |
| 6,406,120 | B2 * | 6/2002 | Pauschinger | 347/19 |
| 6,424,954 | B1 * | 7/2002 | Leon | 705/401 |
| 6,456,987 | B1 * | 9/2002 | Pauschinger | 705/408 |
| 6,466,921 | B1 * | 10/2002 | Cordery et al. | 705/60 |
| 6,526,391 | B1 * | 2/2003 | Cordery et al. | 705/60 |
| 6,546,377 | B1 * | 4/2003 | Gravell et al. | 705/60 |
| 6,619,544 | B2 * | 9/2003 | Bator et al. | 235/381 |
| 6,671,813 | B2 * | 12/2003 | Ananda | 726/3 |
| 6,839,691 | B2 * | 1/2005 | Bator et al. | 705/59 |
| 6,865,558 | B1 * | 3/2005 | Pierce et al. | 705/60 |
| 6,865,560 | B1 * | 3/2005 | Sansone et al. | 705/404 |
| 6,922,678 | B2 * | 7/2005 | Gravell et al. | 705/401 |
| 6,938,018 | B2 * | 8/2005 | Shah et al. | 705/62 |
| 2001/0013025 | A1 * | 8/2001 | Ananda | 705/60 |
| 2001/0027448 | A1 * | 10/2001 | Schor et al. | 705/401 |
| 2001/0039625 | A1 * | 11/2001 | Ananda | 713/202 |
| 2001/0042053 | A1 * | 11/2001 | Wagner et al. | 705/401 |
| 2002/0010688 | A1 * | 1/2002 | Shah et al. | 705/405 |
| 2002/0032660 | A1 * | 3/2002 | Dietrich et al. | 705/60 |
| 2002/0069185 | A1 * | 6/2002 | Kissner et al. | 705/401 |
| 2002/0091545 | A1 * | 7/2002 | Heiden et al. | 705/1 |
| 2002/0095306 | A1 * | 7/2002 | Smith et al. | 705/1 |
| 2003/0144972 | A1 * | 7/2003 | Cordery et al. | 705/401 |
| 2004/0128264 | A1 * | 7/2004 | Leung et al. | 705/402 |
| 2005/0192910 | A1 * | 9/2005 | Auberger et al. | 705/401 |
| 2005/0192912 | A1 * | 9/2005 | Bator et al. | 705/402 |
| 2006/0000883 | A1 * | 1/2006 | Herring | 235/375 |
| 2006/0017758 | A1 * | 1/2006 | Nambudiri et al. | 347/14 |
| 2006/0032910 | A1 * | 2/2006 | Herring | 235/381 |

FOREIGN PATENT DOCUMENTS

| | | |
|---|---|---|
| GB | 2178696 | 2/1987 |
| WO | 01/045051 | 6/2001 |

* cited by examiner

POSTAGE METERING SYSTEM

This application is a national phase of International Application No. PCT/GB03/00389 filed Jan. 31, 2003 and published in the English language.

FIELD OF THE INVENTION

The present invention relates to the security of a postage metering system, and in particular a postage metering system which requires the input of an operating code prior to printing indicia, and more particularly the input of a valid operating code prior to printing indicia having other than a zero value.

SUMMARY OF THE INVENTION

It is an aim of the present invention to provide a postage metering system which provides for improved or at least alternative security.

Accordingly, the present invention provides a postage metering system for applying indicia including postage value on mail items, the system including: a keyboard for inputting information; a printer for printing indicia; an accounting module for accounting for postage value applied to mail items; and a security module for requiring a user to input an operating code prior to further operation of the system, the security module being configured to compare the input operating code with at least one stored valid operating code and cause the printer in a printing operation to print an indicium having a zero postage value where the input operating code and any stored operating code do not match and printing of an indicium is requested.

Preferably, the security module includes a memory for storing the at least one valid operating code.

Preferably, the at least one valid operating code comprises a personal identification number.

Preferably, the accounting module is operative to account for postage value even when an invalid operating code has been input and the postage value applied to a mail item is at zero value.

Preferably, where the input operating code and any stored operating code do not match, the system is configured to log data relating to zero-value printing operations.

More preferably, the security module includes a memory for storing a record of the zero-value printing operations.

Preferably, where the input operating code and any stored operating code do not match, the security module is configured to communicate with a security center to indicate improper operation of the system.

In one embodiment the communication occurs automatically in response to any improper operation.

In another embodiment the communication occurs at intervals.

Preferably, the accounting module includes a zero-value count register for providing a count of the number of zero-value printing operations.

BRIEF DESCRIPTION OF THE DRAWING

A preferred embodiment of the present invention will now be described hereinbelow by way of example only with reference to the accompanying drawing, in which.

DETAILED DESCRIPTION

Figure 1:
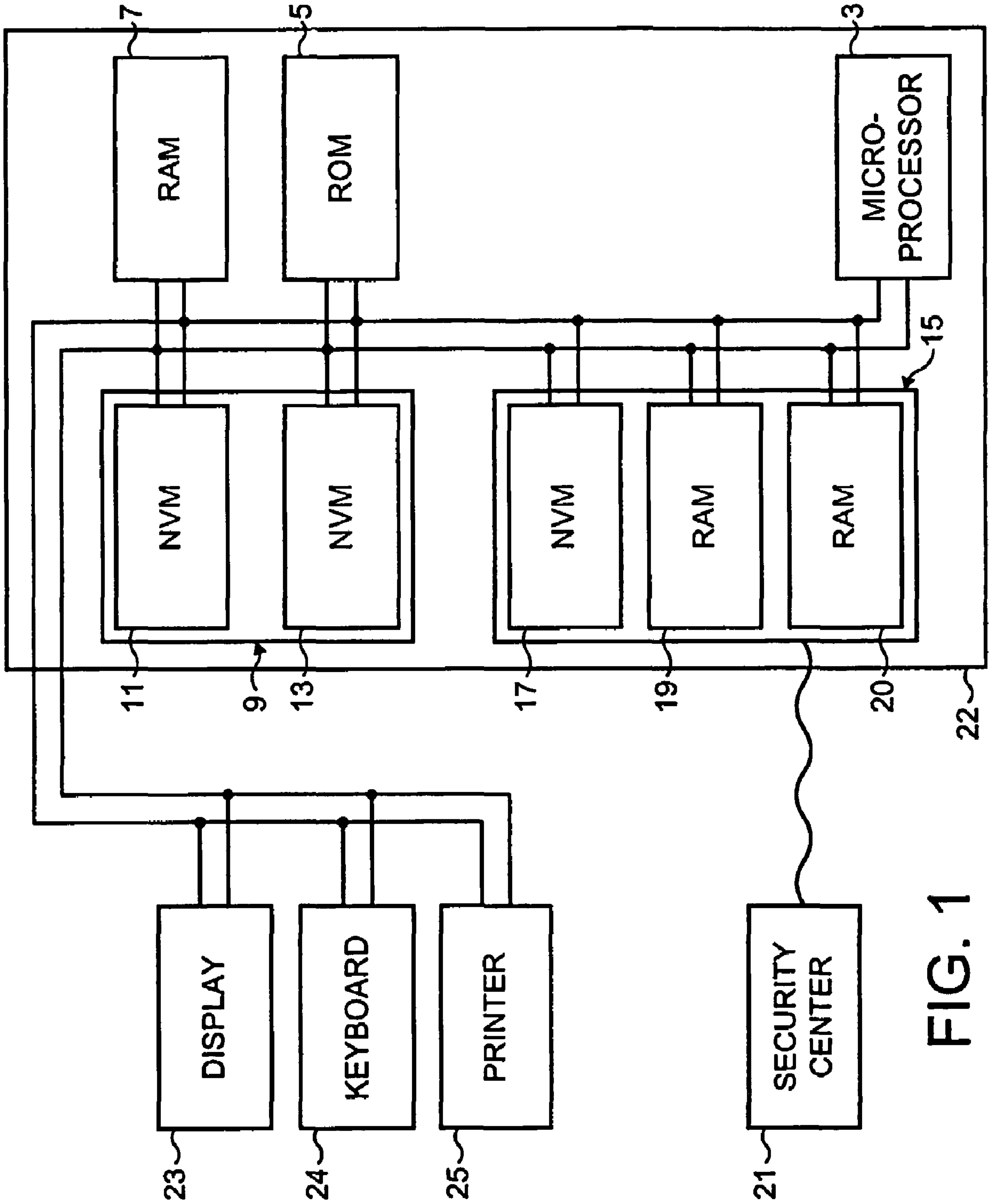
FIG. 1 diagrammatically illustrates a postage metering system in accordance with a preferred embodiment of the present invention.

The postage metering system comprises a microprocessor 3, a read-only memory (ROM) 5 storing program routines for operation of the microprocessor 3, and a random-access memory (RAM) 7 for use as a working store for the temporary storage of data during operation of the system.

The system further comprises an accounting module 9 for accounting for postage value applied to mail items. The accounting module 9 comprises duplicated non-volatile memories (NVMs) 11, 13 for storing accounting data relating to the dispensing of postage value, as applied to mail items, which is required to be retained even when the system is not powered. In this embodiment the NVMs 11, 13 each include inter alia an ascending tote register which represents the accumulated total of the postage value applied by the system in its lifetime, an item count register which represents the total number of mail items to which postage value has been applied by the system in its lifetime, a large items register which represents the total number of mail items to which a postage value in excess of a predetermined value has been applied by the system in its lifetime, a zero-value items register which represents the total number of mail items to which a zero-value postage value has been applied by the system in its lifetime, and a descending credit register which represents the value of credit which is available by the system. In an alternative embodiment the NVMs 11, 13 could include an ascending credit register instead of a descending credit register. By including a zero-value register which registers the number of zero-value imprints, the system can be interrogated to determine the frequency of attempted fraud.

The system further comprises a security module 15 for requiring the input of an operating code, in this embodiment a security code, prior to the printing of indicia.

In this embodiment the system is configured such that, where a valid operating code is entered by a user, that is, where the input operating code matches a stored operating code, the system operates normally and indicia of any postage value can be applied to mail items, and, where an invalid operating code is input by a user, that is, where the input operating code does not match a stored operating code, the system operates normally in the sense that indicia can be printed and the accounting module 9 performs the usual accounting functions, but the postage value applied to mail items is at zero value. In this way, where an invalid operating code is input by a user, the postage indicia obtainable from the system are ineffective as the postage value is a zero postage value, and there is no loss of credit as the postage value is a zero value.

The security module 15 comprises a non-volatile memory (NVM) 17 for storing valid operating codes against which operating codes input by users are to be compared. In this embodiment the system is configured such that valid operating codes can be programmed in the NVM 17 when operated in a supervisor mode. In an alternative embodiment the valid operating codes in the NVM 17 can be factory set.

The security module 15 further comprises a first random-access memory (RAM) 19 for storing the operating code which is input by a user and is subsequently compared to the valid operating codes stored in the NVM 17.

The security module 15 further comprises a second random-access memory (RAM) 20 for storing data relating to any printing operations performed when an invalid operating code has been entered by a user. In this way, a zero postage value record is available of all printing operations having a zero postage value, which record could be used to identify fraudulent use of the system.

In this embodiment the security module 15 is connected, here by a communications link, to a remote security center 21, such as to allow for downloading of the zero postage value record for analysis, and in addition, or alternatively, provide a warning of such fraudulent use to the security center 21. In one embodiment a warning can be communicated at each instance of fraudulent use. In another embodiment any fraudulent use can be communicated at intervals, for example, hourly or daily.

In this embodiment the operating codes are machine-related codes. In an alternative embodiment the operating codes could comprise personal identification numbers (PINs), such that each user has a unique operating code.

In this embodiment the microprocessor 3, the ROM 5, the RAM 7, the accounting module 9 and the security module 15 are all housed in a secure housing 22.

The system further comprises a display 23 for displaying information, a keyboard 24 for inputting information, and a printer 25 for printing indicia on mail items.

In operation, a user is first required to enter an operating code via the keyboard 24. Following entry of an operating code, the system is ready for further operation. Where a valid operating code is entered by a user, the system operates normally and indicia of any postage value can be applied to mail items. However, where an invalid operating code is input by a user, the system operates normally in the sense that the printer 25 can print indicia and the accounting module 9 performs the usual accounting functions, but the postage value applied to mail items is always at zero value. As such, the resulting zero-value postage indicia are ineffective as postage indicia, and, moreover, do not lead to any loss of credit as the value is a zero value.

Finally, it will be understood that the present invention has been described in its preferred embodiment and can be modified in many different ways without departing from the scope of the invention as defined by the appended claims.

What is claimed is:

1. A postage metering system for applying indicia including postage value on mail items, the system including:

a keyboard for inputting information;

a printer for printing indicia;

an accounting module for accounting for postage value applied to mail items; and a security module for requiring a user to input an operating code prior to further operation of the system, the security module being configured to compare the input operating code with at least one stored valid operating code and cause the printer in a printing operation to print an indicium having a zero postage value where the input operating code and any stored operating code do not match and printing of an indicium is requested.

2. The system of claim 1, wherein the security module includes a memory for storing the at least one valid operating code.

3. The system of claim 1, wherein the at least one valid operating code comprises a personal identification number.

4. The system of claim 1, wherein the accounting module is operative to account for postage value even when an invalid operating code has been input and the postage value applied to a mail item is at zero value.

5. The system of claim 1, wherein, where the input operating code and any stored operating code do not match, the system is configured to log data relating to zero-value printing operations.

6. The system of claim 5, wherein the security module includes a memory for storing a record of the zero-value printing operations.

7. The system of claim 1, wherein, where the input operating code and any stored operating code do not match, the security module is configured to communicate with a security center to indicate improper operation of the system.

8. The system of claim 7, wherein the communication occurs automatically in response to any improper operation.

9. The system of claim 7, wherein the communication occurs at intervals.

10. The system of claim 1, wherein the accounting module includes a zero-value count register for providing a count of the number of zero-value printing operations.

* * * * *